Patented Jan. 29, 1935

1,989,641

UNITED STATES PATENT OFFICE 1,989,641

GYPSUM PLASTER

George D. King, Chicago, Ill., assignor to United States Gypsum Company, Chicago, Ill., a corporation of Illinois No Drawing. Application May 9, 1932, Serial No. 610,311

6 Claims. (Cl. 106—34)

This invention relates to a gypsum plaster.

Gypsum plaster is obtained by the calcination of gypsum rock at comparatively low temperatures to hemihydrate or soluble anhydrite, that is, from $CaSO_4.2H_2O$ to $CaSO_4.1/2H_2O$ or $CaSO_4$. These calcined products when gauged with water react chemically with the water to reproduce gypsum dihydrate, $CaSO_4.2H_2O$. When mixed into a plastic consistency with water and allowed to stand, the calcined products hydrate, set, and harden. These calcined gypsum products are used in building and industry because of this setting and hardening property. One application, for example, is as a wall coating or plaster over lath, in which case it is generally mixed with an aggregate of sand or wood fiber, etc. Other materials are mixed with the plaster at times to improve or change the working qualities for special purposes. The time of set or hardening beyond a plastic or workability stage is in normal plaster rather fast, being 30 minutes or less. Therefore, generally, a retarding agent is added to lengthen out or increase the time of set. The retarder generally used is a prepared dispersion of glue on lime and is known to the trade as commercial retarder. A small amount of lime is sometimes used with gypsum plasters to improve working qualities, but it has the fault of causing a marked lengthening out or increasing of the setting time on aging or storage.

While gypsum plaster has a very wide use, and it has general acceptance by the trade for these uses, there are certain faults attendant upon its job performance. These faults necessitate a more extensive and closer supervision of manufacture and job service on the part of the manufacturer, a more rapid rotation of stocks by warehouses, or a manufacture of the material especially for use at predetermined future times, a greater skill on the part of the user on the job; and even with this close supervision and service some unsatisfactory job performances and faulty constructions result.

The hardening time of gypsum plaster on the job is influenced and varied to a great degree by the type, amount, and condition of sand or other aggregate added to the plaster. It is influenced because the sand acts as a seeding agent, disturbing a condition of supersaturation and causing a quicker set than if the sand were not present or were present in different amounts or in different condition. The hardening time is also influenced by the mixing water used and the cleanliness of the mixing tools and mixing container because of the fact that hydrated or set gypsum acts as a seeding agent or accelerator for the rate of hydration or set of a gypsum plaster. The time of set is also influenced by the weather conditions, warmer weather tending to make a plaster harden or set more slowly due, propably, to an increased solubility and efficiency of the commercial retarder. It is an object of this invention to eliminate the effect of these variables and to obtain a cement plaster which is immune to a practical extent to these disturbing influences.

It is an object of this invention to remedy the most flagrant of these faults and to afford a better product to the consumer with the elimination of the cost of supervision and service on the part of the manufacturer.

Another object of this invention is to enable the storage of a gypsum plaster, and more particularly a gypsum plaster containing lime, without the marked lengthening or increasing of the time of set.

Another object of my invention is to obtain a plaster which exhibits improved plasticity and slip under the trowel without the use of a large amount of organic materials or strength destroying plasticizers.

A further object of my invention is to provide a plaster of greater surface hardness and resistance to abrasion.

A still further object of my invention is to provide a plaster which stiffens or hardens more gradually after being gauged with water, thus affording improved trowelability and an increased resistance to lath suction and elimination of lath marks or cracks; also to improve gypsum plasters in other respects hereinafter specified and claimed.

The preferred ingredients of my improved cement plaster are calcined gypsum, retarder, lime, and aluminum sulphate, which latter is an acid salt sometimes known as concentrated alum or paper makers alum, the formula being

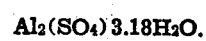

$$Al_2(SO_4)_3.18H_2O.$$

It is of course not necessary to use these exact materials as there are certain other equivalents which will perform the same function. I may rely to some extent upon the lime contained in the commercial retarder, but for best results I prefer to add additional lime.

I shall discuss as a practical application of my invention, gypsum cement plaster which is sanded on the job to produce a material for spreading over lath to construct a wall surface suitable for carrying decoration. In general, the cement plaster is shipped to the job without sand. Different amounts of sand are added in putting on the different plaster coats, as experience has shown this desirable. Also, different amounts of sand may be added by different plasterers for greater hardness or greater economy. With the usual gypsum plaster, difficulty is found in using a coat containing one part by weight of sand and one of plaster for the first coat and then later one part of plaster and four parts of sand for the second coat, due to the fact that if the set is regulated so as to give a practical set for the 1:1 mixture, then the 1:4 mixture will set too quickly, or if vice versa, the set is regulated on the basis of the 1:4 mixture, then the 1:1 mixture will set too slowly. In the first case, the set is so quick that application is difficult before the material loses workability, and in the second case, the set slowness will be apt to cause a drying out and weakening condition by the water leaving the plaster before it is taken up chemically by the calcined gypsum to form the dihydrate.

When my improved cement plaster is used, the setting time of the 1:1 and 1:4 mixtures is found to be equalized so that the amount of sand is not a determining factor in the time of set. My improved cement plaster is found in like manner to resist the effect of dirty mixing water or mixing container on the time of set. The apparent explanation of this property of my improved cement plaster is that the aluminum sulphate and lime react to produce a precipitated gypsum dihydrate, $CaSO_4.2H_2O$, which itself acts as a seeding agent to accelerate the set of a gypsum plaster. In the manufacture of the plaster, sufficient retarder is added to overcome this accelerating influence. It has been found by test that the accelerating influence of a seeding agent, due to each unit of quantity of the seeding agent added, decreases as the amount of seeding agent added is increased. Thus, by providing for a seeding agent in the mill mixed plaster, the effect of the additional job seeding influences of sand or set plaster obtained from dirty vessels, etc. is eliminated. There have been some attempts in the past to attain this end by adding to a mill mixed cement plaster, ground, raw or set gypsum. This has not been found practical and has not been adopted by the industry because of inherent faults. The most important of these faults is that most cement plaster is mixed and bagged while still hot from the calcination processes and this invariably results in the whole or partial calcination of any raw or set gypsum added to the plaster, thus eliminating any future seeding effects. Also, the addition of such a gypsum seeding agent to the plaster induces deterioration, and instability of the plaster while still in the bags, tending to convert a percentage of the plaster to non-setting, non-plastic calcium sulphate dihydrate, and to lower its plasticity and sand carrying capacity, etc. Whereas, the ingredients of my improved cement plaster, on the other hand, cause an improvement in the plaster stability and its plasticity, sand capacity, etc.

For best results in a sanded cement plaster, I have found the following proportions of ingredients preferred:

| | Pounds |
|---|---|
| Calcined gypsum hemihydrate | 2,000 |
| Dolomite hydrated lime | 20-25 |
| Aluminum sulphate $Al_2(SO_4)_3.18H_2O$ | 15-20 |
| Commercial retarder | 8-11 |
| Sand | none to 10,000 |

As an example of the setting characteristics of my improved cement plaster, the following is illustrative.

*Improved plaster*

| | Pounds |
|---|---|
| Calcined gypsum hemihydrate | 2,000 |
| Dolomite hydrated lime | 25 |
| Aluminum sulphate | 20 |
| Commercial retarder | 11 |

| Parts of plaster and sand by weight | Laboratory set, with clean mixing vessels, etc. | Job set, normally dirty mixing box and tools, etc. |
|---|---|---|
| 1 plaster—no sand | 6½ hrs | 4¼ hrs. |
| 1 " —1 " | 6 " | 3 " |
| 1 " —2½ " | 5½ " | 3 " |
| 1 " —4 " | 5 " | 3 " |

*Ordinary wall plaster.—(For comparison)*

| | Pounds |
|---|---|
| Calcined gypsum hemihydrate | 2000 |
| Retarder | 7 |

| Parts of plaster and sand by weight | Laboratory set, with clean mixing vessels, etc. | Job set, normally dirty mixing box and tools, etc. |
|---|---|---|
| 1 plaster—no sand | 49½ hrs | 12¼ hrs. |
| 1 " —1 " | 19 " | 7½ " |
| 1 " —2½ " | 7¾ " | 4¼ " |
| 1 " —4 " | 6 " | 3¼ " |

It will be noted that the setting times for ordinary plaster are very much more varied than with the improved plaster, when comparing clean and job sets and comparing neat plaster and 1 and 4 parts of sand. These results are merely indicative of the stabilizing effect of the ingredients in the improved plaster and in actual use the stabilizing effect is even more noticeable as the variables of aging in storage, weather conditions, variations in cleanliness of vessels and tools, gauging water quality, etc., all combine to give varying set results with ordinary wall plaster.

In determining the quantities of the various ingredients to use in my improved cement plaster, I find that such ingredients may be varied within certain limits. These limits are determined by the condition that the retarder must be in sufficient quantity to slow down or retard the setting time of the plaster so that a reasonably large amount of the plaster may be mixed with water on the job and with sand or other aggregate if desirable, and will retain its plastic state long enough to be applied to the wall without stiffening or setting up in the mixing box. Under usual job conditions, this will mean a setting time of not less than one hour and preferably a job setting time of about two and one-half hours. The quantities of aluminum sulphate and lime used are governed by the degree of stabilization required and by economy, and are preferably used in such quantity that the set with one part of sand by weight when mixed under job or laboratory conditions, will be not more than twelve hours and the set, with four parts of sand by weight when mixed under job or laboratory conditions, will be not less than one hour. The amount of the ingredients which I give in my preferred formula gives setting times much closer together than this with from one to four parts of sand.

I have found that other equivalents for aluminum sulphate may be used, such as other alums, potassium acid sulphate, nickel sulphate, etc. I have found that high calcium lime may be used in place of the dolomite lime, but a smaller amount of the high calcium lime is required. Other retarding materials may be used in place of the commercial retarder, such as powdered glue, sodium acetate, etc.

Another advantage of my invention is the marked improvement in its plasticity, slip under the trowel, sand carrying capacity on storage, resistance to lath suction, and greater surface hardness of the finished dried wall. It is my belief, that these qualities are the result of the interaction of the aluminum salt with the alkaline material, lime, and, dependent upon the concentration of lime present, with the resultant precipitation of colloidal gelatinous aluminum compound, aluminum hydroxide or calcium aluminate. When my main consideration is to achieve the results of improved working quality, etc., I may increase the quantity of aluminum sulphate and lime over that indicated necessary for set stabilization effect, such as 5–30 lbs. aluminum sulphate and 0 to 100 lbs. added hydrated lime, or I may introduce substitutes or equivalents which will not necessarily produce as satisfactory set stabilization effects. I have thus found that ferric sulphate may be substituted for the aluminum sulphate, the retarder may be varied from 4 to 12 lbs. per ton of calcined gypsum, and other alkaline materials capable of reacting with aluminum sulphate to precipitate gelatinous aluminum compounds may be used in addition to or in place of the added lime, such as ammonium carbonate.

I would state in conclusion that, while the examples described constitute practical embodiments of my invention, I do not wish to confine myself precisely to these details since manifestly, the same may be considerably varied without departing from the spirit of the invention as defined in the appended claims.

Having thus described my invention, I claim as new and desire to secure by Letters Patent:—

1. Gypsum plaster whose setting-time is stabilized against disturbance by adventitious admixture of accelerating and retarding influences which comprises calcined calcium sulfate as the setting ingredient and about three percent or less of a set-stabilizing composition which latter comprises a retarder, lime and an acid-reacting soluble sulfate from the group consisting of aluminum, potassium, nickel and ferric iron.

2. Gypsum plaster whose setting-time is stabilized against disturbance by adventitious admixture of accelerating and retarding influences which comprises calcined calcium sulfate as the setting ingredient and about three percent or less of a set-stabilizing composition which latter comprises a retarder, lime and aluminum sulfate.

3. Gypsum plaster whose setting-time is stabilized against disturbance by adventitious admixture of accelerating and retarding influences which comprises calcined calcium sulfate as the setting ingredient and about three percent or less of a set-stabilizing composition which latter comprises a retarder, lime and acid potassium sulfate.

4. Gypsum plaster whose setting-time is stabilized against disturbance by adventitious admixture of accelerating and retarding influences which comprises calcined calcium sulfate as the setting ingredient and about three percent or less of a set-stabilizing composition which latter comprises a retarder, lime and nickel sulfate.

5. The method of preparing a calcined gypsum plaster stabilized as to its setting time against adventitious admixture of accelerating and retarding influences which comprises forming therein by gaging with water seed-crystals of calcium sulfate dihydrate by reaction between the ingredients of a composition which latter comprises lime, retarder and a soluble acid-reacting sulfate from the group consisting of aluminum, potassium, nickel and ferric iron.

6. A set-stabilizing composition to be added to calcined gypsum plasters comprising a mixture of retarder, lime, and a soluble acid-reacting sulfate from the group consisting of aluminum, potassium, nickel and ferric iron.

GEORGE D. KING.